US009289748B1

(12) United States Patent
Romig et al.

(10) Patent No.: US 9,289,748 B1
(45) Date of Patent: Mar. 22, 2016

(54) TREATER REGENERATION

(71) Applicant: Chevron Phillips Chemical Company LP, The Woodlands, TX (US)

(72) Inventors: Ralph W. Romig, Kingwood, TX (US); Robert R. McElvain, Kingwood, TX (US); Steve E. Page, Friendswood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/737,335

(22) Filed: Jun. 11, 2015

(51) Int. Cl.
*B01J 38/02* (2006.01)
*B01J 20/34* (2006.01)

(52) U.S. Cl.
CPC .................................. *B01J 20/3458* (2013.01)

(58) Field of Classification Search
CPC .................................. B01J 38/02; B01J 38/46
USPC .......................................................... 502/36, 56
See application file for complete search history.

(56) References Cited

U.S. PATENT DOCUMENTS

| | | |
|---|---|---|
| 2,625,915 A | 1/1953 | Glasgow et al. |
| 2,906,793 A | 9/1959 | Rowe et al. |
| 3,061,601 A | 10/1962 | Watt |
| 3,248,179 A | 4/1966 | Norwood |
| 3,384,601 A | 5/1968 | Price |
| 3,585,971 A | 6/1971 | Muckelrath |
| 4,212,847 A | 7/1980 | Volmer et al. |
| 4,501,885 A | 2/1985 | Sherk et al. |
| 5,028,670 A | 7/1991 | Chinh et al. |
| 5,534,607 A | 7/1996 | Martens et al. |
| 5,565,175 A | 10/1996 | Hottovy et al. |
| 5,575,979 A | 11/1996 | Hanson |
| 6,096,840 A | 8/2000 | Bernier et al. |
| 6,239,235 B1 | 5/2001 | Hottovy et al. |
| 6,262,191 B1 | 7/2001 | Hottovy et al. |
| 6,355,594 B1 | 3/2002 | McDaniel et al. |
| 6,376,415 B1 | 4/2002 | McDaniel et al. |
| 6,395,666 B1 | 5/2002 | McDaniel et al. |
| 6,511,936 B1 | 1/2003 | Theopold et al. |
| 6,524,987 B1 | 2/2003 | Collins et al. |
| 6,528,448 B1 | 3/2003 | Jensen et al. |
| 6,531,565 B2 | 3/2003 | Kellum et al. |
| 6,534,609 B2 | 3/2003 | Mitchell et al. |
| 6,828,268 B1 | 12/2004 | McDaniel et al. |
| 6,833,415 B2 | 12/2004 | Kendrick et al. |
| 6,852,660 B2 | 2/2005 | Mitchell et al. |
| 6,911,505 B2 | 6/2005 | Small |
| 6,911,506 B2 | 6/2005 | Small et al. |
| 6,936,667 B2 | 8/2005 | Jensen et al. |
| 6,977,235 B2 | 12/2005 | McDaniel et al. |
| 7,056,977 B2 | 6/2006 | Kusudou et al. |
| 7,109,277 B2 | 9/2006 | Hawley et al. |
| 7,119,153 B2 | 10/2006 | Jensen et al. |
| 7,148,298 B2 | 12/2006 | Jensen et al. |
| 7,163,906 B2 | 1/2007 | McDaniel et al. |
| 7,226,886 B2 | 6/2007 | Jayaratne et al. |
| 7,247,594 B2 | 7/2007 | Jayaratne et al. |
| 7,378,537 B2 | 5/2008 | Small et al. |
| 7,501,372 B2 | 3/2009 | Thorn et al. |
| 7,517,939 B2 | 4/2009 | Yang et al. |
| 7,531,606 B2 | 5/2009 | Hendrickson |
| 7,598,327 B2 | 10/2009 | Shaw |
| 7,652,108 B2 | 1/2010 | Mei et al. |
| 8,012,900 B2 | 9/2011 | Murray et al. |
| 8,017,701 B2 | 9/2011 | McElvain et al. |
| 8,119,553 B2 | 2/2012 | Yang et al. |
| 8,138,113 B2 | 3/2012 | Yang et al. |
| 8,207,280 B2 | 6/2012 | Murray et al. |
| 8,288,487 B2 | 10/2012 | Yang et al. |
| 8,383,754 B2 | 2/2013 | Yang et al. |
| 8,431,729 B2 | 4/2013 | Martin et al. |
| 8,501,651 B2 | 8/2013 | Ding et al. |
| 8,703,886 B1 | 4/2014 | Yang et al. |
| 8,846,841 B2 | 9/2014 | Yang et al. |
| 8,912,285 B2 | 12/2014 | Yang et al. |
| 8,932,975 B2 | 1/2015 | Yang et al. |
| 8,987,394 B2 | 3/2015 | Hlavinka et al. |
| 2006/0094590 A1 | 5/2006 | McDaniel et al. |
| 2010/0029872 A1 | 2/2010 | Jensen et al. |
| 2010/0041842 A1 | 2/2010 | Yang et al. |
| 2011/0142738 A1 | 6/2011 | Pandya et al. |
| 2011/0289951 A1 | 12/2011 | Furlong et al. |
| 2013/0306906 A1 | 11/2013 | Das et al. |
| 2014/0004017 A1 | 1/2014 | Lok et al. |

*Primary Examiner* — Edward Johnson
(74) *Attorney, Agent, or Firm* — Conley Rose, P.C.; Rodney B. Carroll; Monte R. Rhodes

(57) ABSTRACT

Disclosed are embodiments of a method of regenerating a desiccant in an off-line treater of a polyolefin production process. The method may include a heating phase followed by a cooling phase. The heating phase may involve use of a regenerating gas made from heating a treated a recycle stream of the polyolefin production process to regenerate desiccant in an off-line treater. The cooling phase may involve thermosyphoning the regenerating gas, nitrogen, an olefin-free diluent, or combinations thereof in a closed-convection loop of the off-line treater.

20 Claims, 1 Drawing Sheet

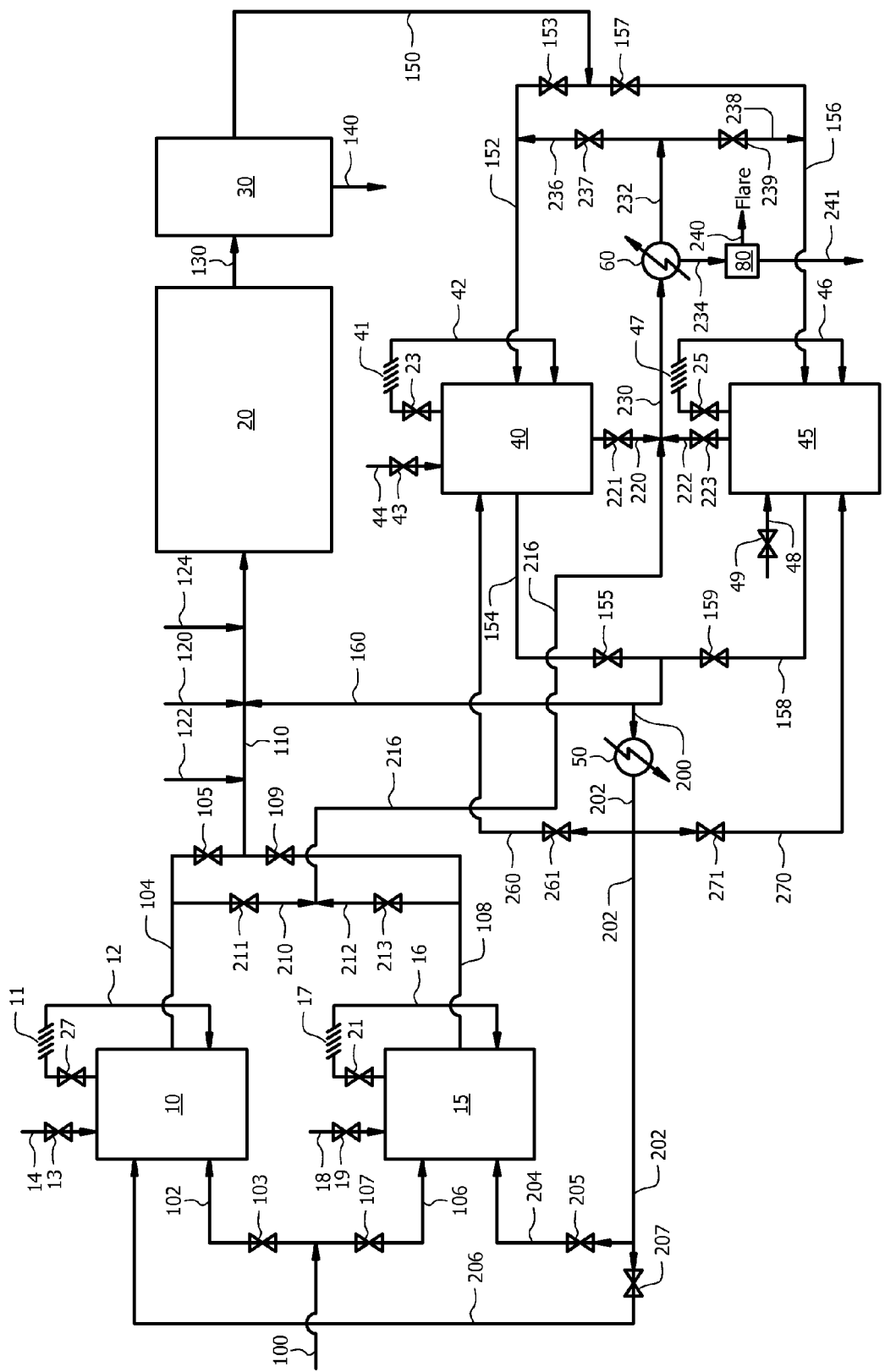

TREATER REGENERATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to the regeneration of feed stream treaters in olefin polymerization processes and systems.

BACKGROUND

Polyolefins can be prepared by polymerization of olefins in one or more reactors where feed materials such as diluent, monomer, comonomer and catalyst are introduced. The catalyst used can be sensitive to process impurities, or "poisons." Thus, polyolefin production processes generally include treating reactor feeds to remove impurities prior to introduction of the feeds into the polymerization reactor(s). Techniques for treating reactor feeds include using a desiccant which traps the impurities. Over time, the desiccant can become saturated with impurities, creating a need for regeneration of the desiccant in order to maintain effective removal of the impurities. However, current regeneration processes can be costly, both in terms of nitrogen and fuel gas consumption, and in terms of the costs associated with regeneration times being longer than a month in some cases.

SUMMARY

Embodiments of the disclosure include a method of regenerating a desiccant in an off-line treater of a polyolefin production process. The method may include a heating phase followed by a cooling phase.

In embodiments, the heating phase may include treating a recycle stream of the polyolefin production process in an on-line treater having desiccant to yield a treated recycle stream, heating at least a portion of the treated recycle stream to yield a regenerating gas, regenerating at least a portion of the desiccant in the off-line treater using the regenerating gas to yield a regenerating effluent stream, separating the regenerating effluent stream into an impurity stream and a regenerating recycle stream, and recycling the regenerating recycle stream to the on-line treater.

In embodiments, the cooling phase may include thermosyphoning a regenerating gas, nitrogen, an olefin-free diluent, or combinations thereof in a closed-convection loop of the off-line treater to cool the off-line treater to a temperature in the range of from 150° F. (66° C.) to 400° F. (204° C.).

BRIEF DESCRIPTION OF THE DRAWINGS

FIG. 1 illustrates a process flow diagram of an embodiment of a polyolefin production process which utilizing treaters for feed and recycle streams according to the disclosure.

DETAILED DESCRIPTION OF THE EMBODIMENTS

Disclosed herein are embodiments which provide for improved regeneration of treaters for feed streams and recycle streams in a polyolefin production process. The treaters according to embodiments of the disclosure include a pair of feed treaters having desiccant (e.g., in one or more desiccant beds) therein for removing water and, in some embodiments, other impurities from a feed stream of the polyolefin production process. In operation, at least one of the pair of feed treaters is on-line (e.g., operates in a continuous mode so as to accept a feed stream and treat the same to yield a treated feed stream) to treat the feed stream of the polyolefin production process which is passed through the feed treater(s) so as to remove one or more impurities. The treated feed stream which flows from the feed treatment system (optionally combined with a treated recycle stream comprising a diluent, with fresh comonomer, or both) passes to a polymerization reactor where polyolefins (also referred to herein interchangeably with the term polymer composition) are formed by contacting the olefin monomer from the treated feed stream with a catalyst system under conditions suitable for the formation of a polymer composition. An effluent is recovered from the polymerization reactor and separated to recover the polymer composition in a product stream and the diluent and any unreacted monomer and/or unreacted comonomer in a recycle stream. The recycle stream is treated in other treaters which include one or a pair of recycle treaters having desiccant (e.g., one or more desiccant beds) therein for removing water and, in some embodiments, other impurities from the recycle stream. In operation, at least one of the pair of recycle treaters is on-line (e.g., operates in a continuous mode so as to accept the recycle stream and treat same to yield a treated recycle stream) to treat the recycle stream of the polyolefin production process which is passed through the recycle treater(s) so as to remove one or more impurities. The treated recycle stream is recycled to the polymerization reactor.

During the course of operation, the treaters of the polyolefin production process may become saturated with impurities, causing impurities to flow through the treaters and into the polymerization reactor. An increase in the melt index of the polymer composition and/or a decrease in polymerization efficiency may indicate saturation of the desiccant in a treater. The feed treaters and recycle treaters are operated in parallel pairs such that one of the pair of feed treaters and/or one of the pair of recycle treaters may be taken off-line line (e.g., isolated from flow of the feed stream or recycle stream by actuating valves as described hereinbelow) so that the desiccant therein may be regenerated while the other of the pair of feed treaters and/or the other of the pair of the recycle treaters is on-line.

Embodiments of regeneration disclosed herein may additionally or alternatively also utilize thermosyphoning, in a cooling phase of regeneration, of nitrogen, of the diluent from the treated recycle stream, of an olefin-free diluent, or combinations thereof, as is described in more detail herein.

The disclosed embodiments include the use of at least a portion of the treated recycle stream to regenerate an off-line treater (e.g., one of a pair of feed treaters which is taken off-line for regeneration, one of a pair of recycle treaters which is taken off-line for regeneration, or both). Using at least a portion of the treated recycle stream to regenerate an off-line treater utilizes available recycle diluent in the polyolefin production process and reduces or negates the need for nitrogen or other regenerating mediums which involve capital expenditure, create additional waste, and/or need subsequent separations and/or storage. Additionally, incorporation of thermosyphoning techniques disclosed herein reduces the cooling time required for the off-line treater being regenerated.

Referring to FIG. 1, there is shown a process flow diagram of an embodiment of a polyolefin production process which has a pair of feed treaters 10 and 15 for a feed stream 100, a polymerization zone 20, a product recovery system 30, and a pair of recycle treaters 40 and 45 for a recycle stream 150.

The feed stream 100 may include one or more olefin monomers as well as one or more impurities. The one or more olefin monomers may include linear or branched olefins having from 2 to 30 carbon atoms. Examples of olefin monomers include ethylene, propylene, 1-butene, 1-hexene, 1-octene, 3-methyl-1-butene, 4-methyl-1-pentene, and combinations thereof. The one or more impurities may include water, oxygen, carbon dioxide, sulfur compounds, alcohols, acetylene, or combinations thereof. Additionally, the feed stream 100 may include one or more other components such as a catalyst, co-catalysts, fresh diluent, additives, or combinations thereof. As discussed herein, the one or more other components may alternatively be added to the polyolefin production process in other locations.

Feed treaters 10 and 15 are operated in parallel such that at least one of the feed treaters 10 and 15 is on-line to treat (e.g., remove one or more impurities from) the feed stream 100, while the other of the feed treaters 10 and 15 is off-line being regenerated, standing by to go on-line, or also on-line but not saturated with impurities. While FIG. 1 shows a single pair of feed treaters 10 and 15, it is contemplated that polyolefin production processes may include multiple pairs of feed treaters, for example from 2 to 20 pairs of feed treaters, or from 2 to 10 pairs of feed treaters, or from 2 to 5 feed treaters.

Each of the feed treaters 10 and 15 may be a vessel having desiccant therein arranged in one or more desiccant beds. For example, and without limitation, each treater 10 and 15 may have from 1 to 30, from 1 to 20, or from 1 to 15 desiccant beds. The desiccant is discussed in more detail herein.

In an embodiment where feed treater 10 is on-line and feed treater 15 is off-line, valve 103 in stream 102 and valve 105 in stream 104 are in the open position, and valve 107 in stream 106 and valve 109 in stream 108 are in the closed position. Untreated olefin monomer of the feed stream 100 flows through valve 103 and stream 102 such that the untreated olefin monomer is introduced into treater 10. In an embodiment, the untreated olefin monomer is introduced into the treater 10 at the bottom of said treater 10. The olefin monomer flows through the desiccant beds in the treater 10, for example, from the bottom to the top of the treater 10, and one or more impurities are removed from the olefin monomer by the desiccant contained in the treater 10. The treated monomer flows from the treater 10 via stream 104, valve 105, stream 110, and into polymerization zone 20. The flow of the olefin monomer in treater 10 may alternatively be from top to bottom.

In an embodiment where feed treater 15 is on-line and feed treater 10 is off-line, valve 107 in stream 106 and valve 109 in stream 108 are in the open position, and valve 103 in stream 102 and valve 105 in stream 104 are in the closed position. Untreated olefin monomer of the feed stream 100 flows through valve 107 and stream 106 such that the untreated olefin monomer is introduced into treater 15. In an embodiment, the untreated olefin monomer is introduced into the treater 15 at the bottom of said treater 15. The olefin monomer flows through the desiccant beds in the treater 15, for example, from the bottom to the top of the treater 15, and one or more impurities are removed from the olefin monomer by the desiccant contained in the treater 15. The treated monomer flows from the treater 15 via stream 108, valve 109, stream 110, and into polymerization zone 20. The flow of the olefin monomer in treater 15 may alternatively be from top to bottom.

Treatment conditions include a residence time sufficient to remove at least a portion of the impurities from the feed stream 100. Treatment conditions may include a temperature in the range of about 35° F. (about 1.6° C.) to about 80° F. (about 27° C.); alternatively, about 40° F. (about 4.4° C.) to about 70° F. (about 21° C.); alternatively, about 45° F. (about 7.2° C.) to about 60° F. (about 15° C.). Treatment conditions may include a pressure in the range of about 600 psig (about 4.14 MPa) to about 850 psig (about 5.86 MPa); alternatively, about 700 psig (about 4.83 MPa) to about 825 psig (about 5.69 MPa); alternatively, about 750 psig (about 5.17 MPa) to about 800 psig (about 5.52 MPa).

The treated feed flowing in stream 104 and/or 108 generally includes a level of impurities that is less than a level of impurities present in the feed stream 100. The amount of an impurity or multiple impurities may be measured and monitored in stream 104, stream 108, and feed stream 100 using techniques known in the art with the aid of this disclosure, for example, high performance liquid chromatography (HPLC), gas chromatography (GC), or Raman spectroscopy. The impurities may be measured in an online apparatus in streams 100, 104 and/or 108, or a sample may be taken from any of stream 104, stream 108, and feed stream 100 and subsequently analyzed for impurity concentration. In embodiments, the treated feed flowing in stream 104 and/or 108 may include less than 200 ppm, less than 150 ppm, less than 100 ppm, less than 75 ppm, or less than 50 ppm of one or more impurities.

With continued reference to FIG. 1, fresh comonomer (e.g., hexene, butene, or combinations thereof) is illustrated as flowing in stream 120, fresh diluent flowing in stream 122, catalyst flowing in stream 124, and treated recycle diluent flowing in stream 160 may be combined with the treated feed in stream 110 prior to introduction to the polymerization zone 20. It is contemplated that any combination of comonomer, catalyst, fresh diluent, and treated recycle diluent may be added to the treated feed for introduction into the polymerization zone 20 via stream 110; or, any of comonomer, catalyst, fresh diluent, and treated recycle diluent may be introduced to the polymerization zone 20 in other locations of the polyolefin production process, e.g., any of the above-cited components may be combined with the components in feed stream 100, or any of the above-cited components may be introduced into the polymerization zone 20 separately of the feed stream 100 or treated feed stream 110. Moreover, while FIG. 1 shows fresh diluent is combined with the treated feed in stream 110 before comonomer and treated recycle diluent, which are combined before the catalyst, the order of combining components which are introduced to the polymerization zone 20 via stream 110 may vary according to techniques known to those skilled in the art with the aid of this disclosure.

The catalyst that can be employed in accordance with the methods and systems of the present disclosure may comprise any catalyst system compatible with and able to produce polyolefins. For example, the catalyst may be a chromium based catalyst system, a single site transition metal catalyst system including both single and multiple (two or more) metallocene catalyst systems, a Ziegler-Natta catalyst system, or combinations thereof. In embodiments, the catalyst may be activated for subsequent polymerization and may or may not be associated with a support material.

Examples of catalyst systems which can be used are described in U.S. Pat. Nos. 6,355,594; 6,376,415; 6,395,666; 6,511,936; 6,524,987; 6,528,448; 6,531,565; 6,534,609; 6,828,268; 6,852,660; 6,911,505; 6,911,506; 6,936,667; 6,977,235; 7,056,977; 7,109,277; 7,119,153; 7,148,298; 7,163,906; 7,226,886; 7,247,594; 7,378,537; 7,501,372; 7,517,939; 8,012,900; 8,119,553; 8,138,113; 8,207,280; 8,288,487; 8,383,754; 8,431,729; 8,501,651; 8,703,886; 8,846,841; 8,912,285; 8,932,975; and 8,987,394, each of which is incorporated by reference herein in its entirety.

The diluent may include hydrocarbons which are alkanes. Examples of suitable diluents for use in accordance with the present disclosure include but are not limited to propane, n-butane, isobutane, n-pentane, isopentane, neopentane, cyclohexane, n-hexane, and heptane. In one or more specific embodiments, the diluent is selected from propane, isobutane, hexane, heptane, or combinations thereof.

Hydrogen and other additives may also be introduced into the polymerization zone 20 (e.g. combined in stream 110, introduced separately, or combined with another component and introduced together with the other component). Hydrogen may be used to control the molecular weight of the polyolefin formed in the polymerization zone 20. Additives may include antistatic materials, chain transfer agents, or other additives known in the art of polyolefin production processes.

The polymerization zone 20 may include one or more polymerization reactors capable of polymerizing olefin monomers to produce polyolefins such as homopolymers or copolymers. In one or more embodiments, the polymerization of olefins may include the homopolymerization of ethylene or propylene; the copolymerization of ethylene and a higher 1-olefin (e.g., 1-butene, 1-pentene, 1-hexene, 1-octene or 1-decene); the copolymerization of propylene and a higher 1-olefin (e.g., 1-butene, 1-pentene, 1-hexene, 1-octene or 1-decene), or combinations thereof (for polyolefin production processes having multiple reactors). Additionally, the polyolefins produced may be unimodal, bimodal, or multimodal. A produced polyolefin may have a first component and a second component. The first component can be a linear low density polyethylene (LLDPE), and the second component can be a high density polyethylene (HDPE). The HDPE can be a high molecular weight (HMW) polyolefin or a low molecular weight (LMW) polyolefin. The LLDPE can be a high molecular weight (HMW) polyolefin or a low molecular weight (LMW) polyolefin. In an embodiment, the HDPE can be a HMW polyolefin, and the LLDPE can be a LMW polyolefin. The first component, the second component, or both the first component and the second component of the polyolefin can have short chain branching.

The various types of reactors suitable for use in the polymerization zone 20 include those known in the art which may be referred to as batch, slurry, gas-phase, solution, high pressure, tubular, or autoclave reactors. Batch-type reactors can include continuous flow stirred-tank (CSTR) reactors. Gas phase reactors may include fluidized bed reactors or staged horizontal reactors. Slurry reactors may include vertical or horizontal loop reactors. High pressure reactors may include autoclave and/or tubular reactors, singly or in combination, and optionally in series. The reactor types can include batch or continuous processes. Batch processes have no product discharge. Continuous processes can utilize intermittent or continuous product discharge. Processes may also include partial or full direct recycle of un-reacted monomer, un-reacted co-monomer, and/or diluent.

In embodiments where polymerization zone 20 has multiple reactors, the one or more reactors may include the same or different type of reactors. The operating conditions in one of the reactors may be different than the operating conditions in the other reactor(s). Multiple reactor systems may include any combination of reactors including, but not limited to, multiple loop reactors, multiple gas reactors, a combination of loop and gas reactors, multiple high pressure reactors, or a combination of high pressure with loop and/or gas reactors. The multiple reactors may be operated in series or in parallel.

Polyolefin production in multiple reactors may include two separate polymerization reactors interconnected by a transfer system thereby making it possible to transfer the polyolefin resulting from the first polymerization reactor into the second polymerization reactor. Alternatively, polymerization in multiple reactors may include the manual transfer of polyolefin from one reactor to subsequent reactors for continued polymerization.

In embodiments where polymerization zone 20 has at least two reactors, the first reactor can produce a first component of a polyolefin product, and the second reactor can produce a second component of a polyolefin product. The first component and the second component can have the characteristics described above. That is, the first component produced in the first reactor can be a linear low density polyethylene (LLDPE), and the second component produced in the second reactor can be a high density polyethylene (HDPE). The LLDPE can be a high molecular weight (HMW) polyolefin or a low molecular weight (LMW) polyolefin. The HDPE can be a high molecular weight (HMW) polyolefin or a low molecular weight (LMW) polyolefin. In an embodiment, the LLDPE produced in the first reactor can be a LMW polyolefin, and the HDPE produced in the second reactor can be a HMW polyolefin, and in some embodiments, the first component, the second component, or both the first component and the second component can have short chain branching.

The polymerization conditions within the polymerization zone 20 include temperature, pressure, flow rate, mechanical agitation, product takeoff, residence time, and concentrations. Any combination of these conditions may be selected to achieve the desired polyolefin properties. Conditions that are controlled for polymerization efficiency and to provide desired product properties may include temperature, pressure, and the concentrations of various reactants. Polymerization temperature can affect catalyst activity, molecular weight of the polyolefin, and molecular weight distribution of the polyolefin.

Polymerization temperatures may include any temperature below the de-polymerization temperature according to the Gibbs Free energy equation. For example, the polymerization temperature may be in the range of about 140° F. (about 60° C.) to about 536° F. (about 280° C.), or about 158° F. (about 70° C.) to about 230° F. (about 110° C.), depending upon the type of polymerization reactor.

Polymerization pressures also vary according to the reactor and polymerization type. The pressure for liquid phase polymerizations in a slurry loop reactor may be less than about 1000 psig (about 6.90 MPa) while the pressure for gas phase polymerization may vary from about 200 psig (about 1.38 MPa) to about 500 psig (about 3.45 MPa). High pressure polymerization in tubular or autoclave reactors may run at pressures of from about 20,000 psig (about 138 MPa) to about 75,000 psig (about 517 MPa). Polymerization reactors can also be operated in a supercritical region occurring at generally higher temperatures and pressures.

The concentration of the various components (e.g., treated feed, treated recycle diluent, catalyst components, comonomer, hydrogen, additives, or combinations thereof) in the polymerization zone 20 can be controlled to produce polyolefins having certain physical and mechanical properties. The proposed end-use product that will be formed by the polyolefin(s) and the method of forming that product can determine the desired properties. Mechanical properties of the formed end-use product may include tensile, flexural, impact, creep, stress relaxation, and hardness tests. Physical properties of the polyolefin polymer produced may include density, molecular weight, molecular weight distribution, melting temperature, glass transition temperature, temperature melt of crystallization, density, stereoregularity, crack growth, long chain branching and rheological measurements, for example.

Examples of polymerization processes suitable for use in the polymerization zone 20 are described in U.S. Pat. Nos. 3,061,601; 3,248,179; 4,212,847; 4,501,885; 5,028,670; 5,534,607; 5,565,175; 5,575,979; 6,096,840; 6,239,235; 6,833,415; 7,531,606; 7,598,327; and 7,652,108, each of which is incorporated by reference herein in its entirety.

With continued reference to FIG. 1, reaction effluent flows from the polymerization zone 20 in stream 130 and into a product recovery system 30. The product recovery system 30 may include a continuous take-off valve, a flashline heater for vaporizing liquid components from the polyolefin (e.g., diluent, unreacted monomer, and unreacted comonomer), a flash vessel for separating the polyolefin product from unreacted monomer, unreacted comonomer, diluent, residual catalyst, or combinations thereof. The polyolefin product may flow from the product recovery system 30 via stream 140, for example, to an extrusion/load-out system. Typically, the polyolefin product is in the form of polymer fluff which is further processed into pellets using an extrusion/load-out system for shipment to customers. The unreacted monomer, unreacted comonomer, diluent, residual catalyst, or combinations thereof may flow from the product recovery system via stream 150.

The product recovery system 30 may include (in addition to or in the alternative to the flash vessel) one or more fractionation vessels to recover the diluent for recycle to the polymerization zone. For example, the one or more fractionation vessels may (not shown for purposes of clarity) remove undesirable heavy components (e.g., $C_6$ hydrocarbons and heavier) and light components (e.g., hydrogen, oxygen, nitrogen, byproducts resulting from the presence of hydrogen/oxygen/nitrogen) from the diluent and unreacted monomer/comonomer. The one or more fractionation vessels may also separate unreacted monomer and/or comonomer from the diluent to yield an olefin-free diluent stream for use in the regeneration of the treaters as described hereinbelow. Examples of product recovery systems 30 are described in U.S. Pat. Nos. 4,501,885; 5,534,607; 5,575,979; 6,096,840; 6,239,235; 6,833,415; 7,531,606; and 7,652,108, each of which is incorporated by reference herein in its entirety. Diluent which is to be recycled to the polymerization zone 20 may also flow in stream 150 from the product recovery system 30 to recycle treater 40 and/or 45.

This disclosure contemplates that other configurations may be utilized to ultimately recover polyolefin product and recycle diluent than the configuration shown in FIG. 1. The present disclosure may be applicable for any polyolefin production process in which a diluent may be recovered from a polymerization zone and subsequently treated for use in regenerating treaters (e.g., feed treaters and recycle treaters) in the polyolefin production process.

Recycle treaters 40 and 45 are operated in parallel such that at least one of the recycle treaters 40 and 45 is on-line to treat (e.g., remove one or more impurities from) the recycle diluent in recycle stream 150, while the other of the recycle treaters 40 and 45 is off-line being regenerated, standing by to go on-line, or also on-line but not saturated with impurities. While FIG. 1 shows a single pair of recycle treaters 40 and 45, it is contemplated that polyolefin production processes may include multiple pairs of recycle treaters, for example from 2 to 20 pairs of recycle treaters, or from 2 to 10 pairs of recycle treaters, or from 2 to 5 recycle treaters.

Each of the recycle treaters 40 and 45 may be a vessel having desiccant therein arranged in one or more desiccant beds. For example, each treater 40 and 45 may have from 1 to 30, from 1 to 20, or from 1 to 15 desiccant beds. The desiccant is discussed in more detail herein.

In an embodiment where recycle treater 40 is on-line and recycle treater 45 is off-line, valve 153 in stream 152 and valve 155 in stream 154 are in the open position, and valve 157 in stream 156 and valve 159 in stream 158 are in the closed position. Untreated recycle components (e.g., untreated diluent, unreacted monomer, unreacted comonomer, or combinations thereof) of the recycle stream 150 flow through valve 153 and stream 152 such that the untreated recycle components are introduced into treater 40. In an embodiment, the untreated recycle components are introduced into the treater 40 at the bottom of said treater 40. The recycle components flow through the desiccant beds in the treater 40, for example, from the bottom to the top of the treater 40, and one or more impurities are removed from the recycle components by the desiccant contained in the treater 40. Treated recycle components (e.g., treated diluent, unreacted monomer, unreacted comonomer, or combinations thereof) may flow from the treater 40 via stream 154, valve 155, stream 160, stream 110, and into polymerization zone 20. The flow of the recycle components in treater 40 may alternatively be from top to bottom.

In an embodiment where recycle treater 45 is on-line and recycle treater 40 is off-line, valve 157 in stream 156 and valve 159 in stream 158 are in the open position, and valve 153 in stream 152 and valve 155 in stream 154 are in the closed position. Untreated recycle components (e.g., untreated diluent, unreacted monomer, unreacted comonomer, or combinations thereof) of the recycle stream 150 flow through valve 157 and stream 156 such that the untreated recycle components are introduced into treater 45. In an embodiment, the untreated recycle components are introduced into the treater 45 at the bottom of said treater 45. The recycle components flow through the desiccant beds in the treater 45, for example, from the bottom to the top of the treater 45, and one or more impurities are removed from the recycle components by the desiccant contained in the treater 45. The treated recycle components (e.g., treated diluent, unreacted monomer, unreacted comonomer, or combinations thereof) may flow from the treater 45 via stream 158, valve 159, stream 160, stream 110, and into polymerization zone 20. The flow of the recycle components in the treater 45 may alternatively be from top to bottom.

Recycle treatment conditions include a residence time sufficient to remove at least a portion of the impurities from the recycle stream 150. Treatment conditions may include a temperature in the range of about 35° F. (about 1.6° C.) to about 80° F. (about 27° C.); alternatively, about 40° F. (about 4.4° C.) to about 70° F. (about 21° C.); alternatively, about 45° F. (about 7.2° C.) to about 60° F. (about 15° C.). Treatment conditions may include a pressure in the range of about 600 psig (about 4.14 MPa) to about 850 psig (about 5.86 MPa); alternatively, about 700 psig (about 4.83 MPa) to about 825 psig (about 5.69 MPa); alternatively, about 750 psig (about 5.17 MPa) to about 800 psig (about 5.52 MPa).

The treated recycle components flowing in stream 154 and/or 158 generally includes a level of impurities that is less than a level of impurities present in the recycle stream 150. The amount of an impurity or multiple impurities may be measured and monitored in stream 154, stream 158, and recycle stream 150 using techniques known in the art with the aid of this disclosure, for example, high performance liquid chromatography (HPLC), gas chromatography (GC), or Raman spectroscopy. The impurities may be measured in an online apparatus in streams 150, 154, and/or 158, or a sample may be taken from any of stream 154, stream 158, and recycle stream 150 and subsequently analyzed for impurity concentration. In embodiments, the treated recycle components may include less than 200 ppm, less than 150 ppm, less than 100 ppm, less than 75 ppm, or less than 50 ppm of impurities.

The disclosure contemplates that the polyolefin production process shown in FIG. 1 may include equipment such as storage tanks (e.g., for storing monomer, comonomer, diluent, and catalyst), accumulators, valves, pipes, pumps, heat exchangers, agitators, injection apparatus, flow meters, measurement equipment, control system, or combinations thereof which are not illustrated in FIG. 1 for purposes of clarity.

The desiccant in the one or more desiccant beds in treaters 10, 15, 40, and 45 may be molecular sieve, activated alumina, silica gel, montmorillonite clay, calcium oxide, calcium sulfate, calcium chloride, activated carbon, metal salts, phosphorus-containing desiccant compounds, or combinations thereof. The term "molecular sieve" refers to a material having a fixed, open-network structure, usually crystalline, that may be used to separate hydrocarbons from the impurities disclosed herein by selective occlusion of one or more of the impurities. An example of a molecular sieve is a zeolite, which has a silicate lattice, often in association with aluminum, boron, gallium, iron, and/or titanium. An example of a zeolite is a 13× molecular sieve. In accordance with one or more embodiments, the molecular sieves have a pore size of 10 angstroms (Å) or more. An example of activated alumina is sodium treated alumina.

The desiccant beds absorb one or more of the disclosed impurities such that such impurities do not pass out of the treaters 10, 15, 40, and 45 and into subsequent polymerization reactors (except in cases where a treater is saturated and impurities pass through the treaters). Once the desiccant in any of treaters 10, 15, 40, and 45 becomes saturated with one or more impurities, regeneration is required.

Regeneration of the desiccant in treaters 10, 15, 40, and 45 generally involves i) taking the treater 10, 15, 40, or 45 off-line, and ii) regenerating the desiccant. Generally, only one of the pair of feed treaters 10 and 15 and one of the pair of recycle treaters 40 and 45 is taken off-line at a time. It is contemplated that one of the pair of feed treaters 10 and 15 and one of the pair of recycle treaters 40 and 45 may be off-line at the same point in time.

Taking a treater 10, 15, 40, or 45 off-line generally involves closing valves so as to fluidly isolate the treater which is to be taken off-line. To take treater 10 off-line, valves 103 and 105 are actuated to the closed position. To take treater 15 off-line, valves 107 and 109 are actuated to the closed position. To take treater 40 off-line, valves 153, 155, and 237 are actuated to the closed position. To take treater 45 off-line, valves 157, 159, and 239 are actuated to the closed position. It is contemplated that polyolefin production processes may have valves and/or piping in different configurations than that shown in FIG. 1, and the particular procedure for rendering a treater off-line may be different than those described herein while still involving fluidly isolating the treater from the rest of the polyolefin production process.

Preparing the off-line treater for regeneration generally involves depressurizing the off-line treater, and fluidly connecting the off-line treater to receive the treated recycle stream and to emit impurities in a flow path that is recycled to the recycle treater 40 and/or 45.

Depressurizing the off-line treater generally involves releasing contents of the off-line treater until the pressure of the treater reaches a suitable pressure, e.g., about 150 psig (1.03 MPa) or less. The contents of the off-line treater can be released through a purge stream or one of the streams shown in FIG. 1 for treaters 10, 15, 40, and 45.

To fluidly connect the feed treater 10 which is off-line for regeneration, valves 207 and 211 are actuated to the open position such that the off-line feed treater 10 is fluidly connected to the treated recycle stream 160 (via streams 200, 202, and 206) and to a flow path which is the regenerating effluent stream (which, in FIG. 1, is the flow path defined by streams 104, 210, 216, and 230). To fluidly connect the feed treater 15 which is off-line for regeneration, valves 205 and 213 are actuated to the open position such that the off-line feed treater 15 is fluidly connected to the treated recycle stream 160 (via streams 200, 202, and 204) and to a flow path which is the regenerating effluent stream (which, in FIG. 1, is the flow path defined by streams 108, 212, 216, and 230). To fluidly connect the recycle treater 40 which is off-line for regeneration, valves 261 and 221 are actuated to the open position such that the off-line recycle treater 40 is fluidly connected to the treated recycle stream 160 (via streams 200, 202, and 260) and to a flow path which is the regenerating effluent stream (which, in FIG. 1, is the flow path defined by streams 220 and 230). To fluidly connect the recycle treater 45 which is off-line for regeneration, valves 271 and 223 are actuated to the open position such that the off-line recycle treater 45 is fluidly connected to the treated recycle stream 160 (via streams 200, 202, and 270) and to a flow path which is the regenerating effluent stream (which, in FIG. 1, is the flow path defined by streams 222 and 230).

After the treater 10, 15, 40, or 45 is taken off-line, depressurized, and fluidly connected (to the treated recycle stream 160 and to the respective flow path which is the regenerating effluent stream, as described for each treater 10, 15, 40, and 45 above), the process of regenerating the desiccant therein may commence. The process of regenerating the desiccant may be divided into phases: a heating phase, a cooling phase, a holding phase, or combinations thereof.

The heating phase includes treating the recycle stream 150 of the polyolefin production process in an on-line treater (e.g., one or both of recycle treaters 40 and 45 which are on-line) to yield the treated recycle stream 160, heating at least a portion of the treated recycle stream 160 to yield a regenerating gas, regenerating at least a portion of the desiccant in the off-line treater (feed treater 10 or 15 which is off-line, and/or recycle treater 40 or 45 which is off-line) using the regenerating gas to yield a regenerating effluent stream (described in more detail below), separating the regenerating effluent stream into an impurity stream 234 and a regenerating recycle stream 232; and recycling the regenerating recycle stream 232 to the on-line treater (one or both of recycle treaters 40 and 45).

The step of treating the recycle stream 150 is performed as described above for recycle treaters 40 or 45. When recycle treater 40 is on-line, treated recycle components flow in stream 154 through valve 155 and into treated recycle stream 160. When recycle treater 45 is on-line, treated recycle components flow in stream 158 through valve 159 and into treated recycle stream 160.

In the step of heating, a portion (e.g., 1 wt % to 99 wt %, 10 wt % to 90 wt %, or 20 wt % to 80 wt %) of the treated recycle stream 160 flows into heater 50 via stream 200 where the treated recycle components are heated to a temperature in the range of 400° F. (204° C.) to 600° F. (316° C.) so as to vaporize said components to yield a regenerating gas. The regenerating gas may be the treated recycle components (e.g., diluent, unreacted monomer, unreacted comonomer, or combinations thereof) in gaseous phase. In embodiments, the regenerating gas may additionally include nitrogen; alternatively, the regenerating gas may not include (exclude) nitrogen. The regenerating gas may flow from the heater 50 in stream 202. The heater 50 may be any heating system known in the art such as a heat exchanger, an electric heater, or a combination thereof connected in series. Examples of a heating system of heater 50 are found in U.S. Pat. Nos. 2,625,915 and 3,585,971, each of which is incorporated herein by reference in its entirety.

The step of regenerating may include introducing the regenerating gas into the off-line treater being regenerated, and removing an impurity (e.g., of the one or more impurities discussed herein) from the desiccant in the off-line treater with the regenerating gas. In the step of regenerating, the regenerating gas may flow via stream 202 to one of the pair of feed treaters 10 and 15 which is off-line for regeneration, to one of the pair of recycle treaters 40 and 45 which is off-line for regeneration, or both. When feed treater 10 is off-line for regeneration, the regenerating gas flows via stream 202, valve 207, and stream 206 for introduction to the feed treater 10. When feed treater 15 is off-line for regeneration, the regenerating gas flows via stream 202, valve 205, and stream 204 for introduction to the feed treater 15. When recycle treater 40 is off-line for regeneration, the regenerating gas flows via stream 202, valve 261, and stream 260 for introduction to the recycle treater 40. When recycle treater 45 is off-line for regeneration, the regenerating gas flows via stream 202, valve 271, and stream 270 for introduction to the recycle treater 45. In embodiments, the regenerating gas passes through the desiccant in the off-line treater being regenerated from bottom to top. Alternatively, the regeneration gas may flow through the off-line treater from top to bottom.

The regenerating gas passes through the desiccant (e.g., in one or more desiccant beds) of the off-line treater being regenerated during the heating phase as the temperature increases to the temperature of regeneration, e.g. a temperature in the range of about 400° F. (204° C.) to 600° F. (about 316° C.), or about 450° F. (about 232° C.) to about 600° F. (about 316° C.). The pressure of the off-line treater may increase as the temperature increases, and the regeneration pressure includes a pressure in the range of about 600 psig (about 4.14 MPa) to about 850 psig (about 5.86 MPa), about 700 psig (about 4.83 MPa) to about 825 psig (about 5.69 MPa), or about 750 psig (about 5.17 MPa) to about 800 psig (about 5.52 MPa). Alternatively, the pressure of the off-line treater may be maintained at a regeneration pressure during the heating phase, e.g., for feed treater 10, using stream 14 (e.g., a pressure supply steam) having appropriate valve 13 for maintaining the pressure of the feed treater 10. Likewise, stream 18 (e.g., a pressure supply stream) having appropriate valve 19 may be used for maintaining the pressure of the feed treater 15 during the heating phase, stream 44 (e.g., a pressure supply steam) having appropriate valve 43 may be used for maintaining the pressure of the recycle treater 40 during the heating phase, and stream 48 (e.g., a pressure supply steam) having appropriate valve 49 may be used for maintaining the pressure of the recycle treater 45 during the heating phase. For maintaining the pressure of the off-line treater being regenerated, pressurized nitrogen gas may be used.

The regenerating gas together with one or more impurities of the desiccant flows from the off-line treater being regenerated in a regenerating effluent stream to a separator 60. For feed treater 10, the regenerating effluent stream is defined by streams 104, 210, 216, and 230. For feed treater 15, the regenerating effluent stream is defined by streams 108, 212, 216, and 230. For recycle treater 40, the regenerating effluent stream is defined by streams 220 and 230. For recycle treater 45, the regenerating effluent stream (as illustrated in FIG. 1) is the flow path defined by streams 222 and 230.

In the step of separating the regenerating effluent stream, the separator 60 separates the components of the regenerating effluent stream into an impurity stream 234 and a regenerating recycle stream 232. The separator 60 may be a condenser which is configured to cool the components of the regenerating effluent stream such that at least one of the components condenses and separates so as to yield the impurity stream and the regenerating recycle stream.

For example, in embodiments where the one or more impurities in the regenerating effluent stream include water, the gaseous diluent (optionally also with unreacted monomer, unreacted comonomer, or both) and water vapor may condense in separator 60 to for the liquid phase of water and the liquid phase of diluent (optionally also with unreacted monomer, unreacted comonomer, or both). The liquid phase of water and the liquid phase of diluent may phase separate from one another. It is contemplated that other impurities may dissolve and separate from the diluent with the water. It is also contemplated that any unreacted monomer and any unreacted comonomer may dissolve in the diluent liquid phase and separate from water with the liquid diluent. In an embodiment, the separator 60 and heater 50 may include the same device which is a cross exchanger which allows the hot gaseous components of the regenerating effluent stream to heat the treated recycle components flowing from the treated recycle stream 160 (and for the treated recycle components to cool the gaseous components of the regenerating effluent stream). The one or more phase-separated impurities may flow from the separator 60 via stream 234 into a knockout pot 80, where impurities may be flared via stream 240 or may flow from the knockout pot 80 via stream 241 for waste disposal (e.g., wastewater disposal). Appropriate equipment may be included in the regenerating recycle stream such that the temperature and pressure of the liquid phase diluent flowing therein is appropriate for flow to the recycle treater 40 and/or 45.

In other embodiments, the separator 60 may separate the one or more impurities which are lighter than the gaseous diluent by condensing the diluent to a liquid phase while the one or more impurities remain in the gaseous phase. In yet other embodiments, the separator 60 may separate the one or more impurities (e.g., water) which are heavier than the gaseous diluent by condensing the water vapor to the liquid phase of water while the diluent (optionally, also any unreacted monomer and any unreacted comonomer) remains in the gaseous phase. In such embodiments, the gaseous phase diluent may be condensed, compressed, or both to a liquid phase for recycle to the recycle treaters 40 and/or 45, or the gaseous phase diluent may flow to the recycle treater 40 and/or 45 without further equipment processing.

In the step of recycling, the gaseous phase of diluent (optionally also unreacted monomer, unreacted comonomer, or both) recovered from the separator 60 is recycled back to one or both of recycle treaters 40 and 45 which are on-line. For example, the flow path which is stream 232, valve 237, stream 236, and stream 152 defines the regenerating recycle stream which recycles the components recovered from the separator 60 to the recycle treater 40. The flow path which is stream 232, valve 239, stream 238, and stream 156 defines the regenerating recycle stream which recycles the components recovered from the separator 60 to the recycle treater 45. Recycling the components used to regenerate an off-line treater to one or both of recycle treaters 40 and 45 which are on-line accounts for any residual impurities that remain in the liquid diluent after separation in separator 60. In such embodiments, the recycle treater 40 and/or 45 may remove residual impurities from the components of the regenerating recycle stream which are introduced to said recycle treater 40 and/or 45.

In embodiments, the heating phase may be performed in the absence of nitrogen.

Once the temperature of regeneration is reached in the off-line treater being regenerated, the method of regenerating the desiccant in the off-line treater may enter a holding phase followed by a cooling phase, the method may enter directly to the cooling phase without a holding phase, or the method may enter into the cooling phase followed by a holding phase.

In the holding phase before the cooling phase, the temperature of the off-line treater being regenerated may be maintained at the regeneration temperature for a period of time. For example, the temperature may be maintained for about 0.25, 0.5, 1, 2, 3, 4, 5, 6, 7, 8, 9, or more hours. During the holding phase, the regenerating gas may continue to pass though the desiccant and out of the off-line treater, or flow of the regenerating gas through the off-line treater may be stopped. In embodiments of the holding phase which continue the flow of regenerating gas through the off-line treater, heating of the treated recycle components in heater 50 may continue in order to maintain the temperature of the off-line treater at the regenerating temperature.

In a cooling phase which is performed directly after the heating phase or after the holding phase, the method for regenerating the off-line treater includes thermosyphoning the regenerating gas, nitrogen, an olefin-free diluent, or combinations thereof in a closed-convection loop of the off-line treater to cool the off-line treater to a temperature in the range of about 150° F. (66° C.) to about 400° F. (204° C.).

To begin the cooling phase of regenerating the off-line treater, the flow of regenerating gas is stopped, said off-line treater is blocked-in, and the closed-convection loop is opened. To stop the flow of regenerating gas to the feed treater 10 which is off-line, valve 207 is actuated to the closed position. To block-in the feed treater 10, valve 211 is also actuated to the closed position, making all valves in streams entering and exiting the feed treater 10 set to the closed position (valves 103 and 105 having previously been closed). To open the closed-convection loop 12 of the feed treater 10, valve 27 is actuated to the open position. The flow of regenerating gas to feed treater 15 is similarly stopped by actuating valve 205 to the closed position, said feed treater 15 is similarly blocked-in by actuating valve 213 to the closed position, and the closed-convection loop 16 of the feed treater 15 is opened by actuating value 21 to the open position. Likewise, the flow of regenerating gas to recycle treater 40 is stopped by actuating valve 261 to the closed position, said recycle treater 15 is blocked-in by actuating valve 221 to the closed position, and the closed-convection loop 42 of the recycle treater 40 is opened by actuating valve 23 to the open position. Finally, the flow of regenerating gas to recycle treater 45 is similarly stopped by actuating valve 159 to the closed position, said recycle treater 45 is similarly blocked-in by actuating value 223 to the closed position, and the closed-convection loop 46 of the recycle treater 45 is opened by actuating valve 25 to the open position.

Each closed-convection loop 12, 16, 42, and 46 of treater 10, 15, 40, and 45 includes a cooler 11, 17, 41, and 47, respectively. In the embodiment illustrated in FIG. 1, the coolers 11, 17, 41, and 47 are finned air coolers, although any acceptable cooler may be used in accordance with the present disclosure. Generally, each closed-convection loop 12, 16, 42, and 46 has an end connected to the top and an end connected to the bottom of the treater 10, 15, 40, and 45, respectively. Each cooler 11, 17, 41, 47 is positioned in the closed-convection loop 12, 16, 42, 46 proximate the end which is connected to the top of the treater 10, 15, 40, 45.

For feed treaters 10 and 15, nitrogen or the regenerating gas can be used in thermosyphoning whichever one of the feed treaters 10 or 15 is off-line. For purposes of efficiency, the feed treater 10 is discussed with the intention that the same thermosyphoning technique applies to feed treater 15.

In embodiments which use nitrogen for thermosyphoning the feed treater 10, nitrogen is added to the feed treater 10 via stream 14 (e.g., a nitrogen supply stream) and valve 13. In embodiments which use nitrogen, the regenerating gas can be previously removed from the feed treater 10 before blocking-in the feed treater 10. The nitrogen is drawn out of the top of the feed treater 10 into the closed-convection loop 12. The nitrogen experiences convective cooling in the cooler 11, and natural convection causes the cooled nitrogen to flow further into the closed-convection loop 12 until the cooled nitrogen flows back into the bottom of the feed treater 10. The cooled nitrogen which enters the bottom of the feed treater 10 from the closed-convection loop 12 is heated by the cooling desiccant, which causes the nitrogen to warm and rise to the top of the feed treater 10, where flow through the closed-convection loop 12 is repeated. Circulation of nitrogen through the closed-convection loop 12 occurs due to temperature gradients in the off-line treater 10. Circulation may be stopped when the temperature of the feed treater 10 (e.g., measured in the desiccant therein or as the nitrogen temperature at a point in the treater 10 or in the closed-convection loop 12) reaches a cooled temperature in the range of 150° F. (66° C.) to 400° F. (204° C.). The pressure of the feed treater 10 (which is off-line) can be maintained during thermosyphoning with nitrogen through nitrogen pressure supplied via stream 14 (e.g., a nitrogen pressure supply stream).

In embodiments which use the regenerating gas for thermosyphoning the feed treater 10, the regenerating gas remaining in the feed treater 10 after stopping the regenerating gas flow and blocking-in of the feed treater 10 is drawn out of the top of the feed treater 10 into the closed-convection loop 12. The regenerating gas experiences convective cooling in the cooler 11, and natural convection causes the cooled regenerating gas to flow further into the closed-convection loop 12 until the cooled regenerating gas flows back into the bottom of the feed treater 10. The cooled regenerating gas which enters the bottom of the feed treater 10 from the closed-convection loop 12 is heated by the cooling desiccant, which causes the regenerating gas to warm and rise to the top of the feed treater 10, where flow through the closed-convection loop 12 is repeated. Circulation of the regenerating gas through the closed-convection loop 12 occurs due to temperature gradients in the off-line treater 10. Circulation may be stopped when the temperature of the feed treater 10 (e.g., measured in the desiccant therein or as the regenerating gas temperature at a point in the treater 10 or in the closed-convection loop 12) reaches a cooled temperature in the range of 150° F. (66° C.) to 400° F. (204° C.). In an embodiment, use of the regenerating gas for thermosyphoning the feed treater 10 may be in the absence of nitrogen.

For recycle treaters 40 and 45, nitrogen, the regenerating gas, olefin free diluent, or combinations thereof can be used in thermosyphoning whichever one of the recycle treaters 40 or 45 is off-line. For purposes of efficiency, the recycle treater 40 is discussed with the intention that the same thermosyphoning technique applies to recycle treater 45.

In embodiments which use nitrogen for thermosyphoning the recycle treater 40, nitrogen is added to the recycle treater 40 via stream 44 (e.g., a nitrogen supply stream) and valve 43. In embodiments which use nitrogen, the regenerating gas can be previously removed from the recycle treater 40 before blocking-in the recycle treater 40. The nitrogen is drawn out of the top of the recycle treater 40 into the closed-convection loop 42. The nitrogen experiences convective cooling in the cooler 41, and natural convection causes the cooled nitrogen to flow further into the closed-convection loop 42 until the cooled nitrogen flows back into the bottom of the recycle treater 40. The cooled nitrogen which enters the bottom of the recycle treater 40 from the closed-convection loop 42 is heated by the cooling desiccant, which causes the nitrogen to warm and rise to the top of the recycle treater 40, where flow through the closed-convection loop 42 is repeated. Circulation of nitrogen through the closed-convection loop 42 occurs due to temperature gradients in the off-line treater 40. Circulation may be stopped when the temperature of the recycle treater 40 (e.g., measured in the desiccant therein or as the nitrogen temperature at a point in the treater 40 or in the closed-convection loop 42) reaches a cooled temperature in the range of 150° F. (66° C.) to 400° F. (204° C.). The pressure of the recycle treater 40 (which is off-line) can be maintained during thermosyphoning with nitrogen through nitrogen pressure supplied via stream 44 (e.g., a nitrogen pressure supply stream).

In embodiments which use the regenerating gas for thermosyphoning the recycle treater 40, the regenerating gas remaining in the recycle treater 40 after stopping the regenerating gas flow and blocking-in of the recycle treater 40 is drawn out of the top of the recycle treater 40 into the closed-convection loop 42. The regenerating gas experiences convective cooling in the cooler 41, and natural convection causes the cooled regenerating gas to flow further into the closed-convection loop 42 until the cooled regenerating gas flows back into the bottom of the recycle treater 40. The cooled regenerating gas which enters the bottom of the recycle treater 40 from the closed-convection loop 42 is heated by the cooling desiccant, which causes the regenerating gas to warm and rise to the top of the recycle treater 40, where flow through the closed-convection loop 42 is repeated. Circulation of regenerating gas through the closed-convection loop 42 occurs due to temperature gradients in the off-line treater 40. Circulation may be stopped when the temperature of the recycle treater 40 (e.g., measured in the desiccant therein or as the regenerating gas temperature at a point in treater 40 of in the closed-convection loop 42) reaches a cooled temperature in the range of 150° F. (66° C.) to 400° F. (204° C.). In an embodiment, use of the regenerating gas for thermosyphoning the recycle treater 40 may be in the absence of nitrogen.

In embodiments which use a combination of nitrogen, the regenerating gas, and olefin-free diluent for thermosyphoning, two stages are performed. First, nitrogen, the regenerating gas, or both is thermosyphoned in the closed-convection loop 42 of the recycle treater 40 as described above to cool the recycle treater 40 to a first temperature of about 350° F. (about 177° C.). Second, an olefin-free diluent (e.g., obtained from product recovery system 30) is introduced into the recycle treater 40 and then thermosyphoned in the closed-convection loop 42 of the recycle treater 40 in a manner similar to that described above for the regenerating gas and nitrogen to cool the recycle treater 40 from the first temperature to the a second temperature of about 150° F. (about 66° C.). In an embodiment of the second stage, the regenerating gas and/or the nitrogen used in thermosyphoning is removed such that the olefin-free diluent is the predominant (e.g., greater than 95, 96, 97, 98, 99, or more vol % of the treater 40) regenerating material in the recycle treater 40 in the second stage of the cooling phase.

In the holding phase after the cooling phase, the temperature of the off-line treater being regenerated may be maintained at the cooled temperature for a period of time. For example, the temperature may be maintained for less than 1 hour, or for about 1, 2, 3, 4, 5, 6, 7, 8, 9, 10, 11, 12, 13, 14, 15, 16, 17, 18, 19, 20 or more hours.

Utilization of thermosyphoning in combination with a cooler in the closed-convection loop reduces the cooling time for the cooling phase.

Regeneration of treaters 10, 15, 40, and 45 reduces the amount of the one or more impurities in the treaters 10, 15, 40, and 45. Embodiments contemplate the amount of impurities may be measured and monitored in stream 104 for feed treater 10, in stream 108 for feed treater 15, in stream 154 for recycle treater 40, and in stream 158 for recycle treater 45. Monitoring and measuring of the impurities enables regeneration for a time sufficient to reduce the impurities in the regenerating effluent stream passing stream 104, 108, 154, or 158 to a desired level (e.g., less than 100, 90, 80, 70, 60, 50, 40, 30, 20, 10, 9, 8, 7, 6, 5, 4, 3, 2, 1, or less ppm based on weight of the regenerating effluent stream). Impurity levels may be measured using techniques known in the art with the aid of this disclosure, for example, high performance liquid chromatography (HPLC), gas chromatography (GC), or Raman spectroscopy. The impurities may be measured in an online apparatus in streams 104, 108, 150, and/or 154, or a sample may be taken from any of streams 104, 108, 154, and/or 158 and subsequently analyzed for impurity concentration.

After regeneration, the off-line treater remains in stand-by mode until the other of the pair of treaters needs regeneration. Alternatively, after regeneration, the off-line treater is brought on-line without any stand-by. To take treater 10 on-line, valves 103 and 105 are actuated to the open position. To take treater 15 on-line, valves 107 and 109 are actuated to the open position. To take treater 40 on-line, valves 153, 155, and 237 are actuated to the open position. To take treater 45 on-line, valves 157, 159, and 239 are actuated to the open position.

Utilizing at least a portion of the treated recycle stream as the regenerating gas in at least part of the regeneration process (e.g., in the heating phase, a holding phase, the cooling phase, or combinations thereof) of a treater reduces the amount of nitrogen needed for regeneration and utilizes an already existing supply of regenerating material (e.g., the treated recycle components) for regenerating treaters. Using less nitrogen reduces the nitrogen supply burden needed for modern polyolefin production processes, which saves costs and frees nitrogen supply for other uses in the polyolefin production process. Moreover, using less nitrogen results in fewer $NO_x$ emissions at the flare since the treated recycle components (which are recycled to the recycle treaters 40 and 45 and not flared) can be used in place of nitrogen for regeneration. Further utilizing the existing supply of treated recycle components for regeneration eliminates any cost for obtaining regenerating materials.

ADDITIONAL DESCRIPTION

Embodiments of methods for treater regeneration have been described. The following are a first set of nonlimiting, specific embodiments in accordance with the present disclosure:

Embodiment 1 is a method of regenerating a desiccant in an off-line treater of a polyolefin production process, the method comprising a heating phase followed by a cooling phase, the heating phase comprising treating a recycle stream of the polyolefin production process in an on-line treater to yield a treated recycle stream; heating at least a portion of the treated recycle stream to yield a regenerating gas; regenerating at least a portion of the desiccant in the off-line treater using the regenerating gas to yield a regenerating effluent stream; separating the regenerating effluent stream into an impurity stream and a regenerating recycle stream; and recycling the regenerating recycle stream to the on-line treater.

Embodiment 2 is the method of embodiment 1, the cooling phase comprising thermosyphoning the regenerating gas, nitrogen, or both in a closed-convection loop of the off-line treater to cool the off-line treater to a temperature in the range of 150° F. (66° C.) to 400° F. (204° C.).

Embodiment 3 is the method of embodiment 2, wherein the closed-convection loop comprises a finned air cooler.

Embodiment 4 is the method of embodiment 1, the cooling phase comprising thermosyphoning the regenerating gas, nitrogen, or both in a closed-convection loop of the off-line treater to cool the off-line treater to a first temperature of about 350° F. (about 177° C.); and thermosyphoning an olefin-free diluent in the closed-convection loop of the off-line treater to cool the off-line treater from the first temperature to a second temperature of about 150° F. (about 66° C.).

Embodiment 5 is the method of embodiment 4, wherein the closed-convection loop comprises a finned air cooler.

Embodiment 6 is the method of any of embodiments 1 to 5, wherein the off-line treater reaches a temperature in the range of 400° F. to (204° C.) to 600° F. (316° C.) during the heating phase.

Embodiment 7 is the method of any of embodiments 1 to 6, wherein the step of regenerating comprises introducing the regenerating gas into the off-line treater; and removing an impurity from the desiccant of the off-line treater with the regenerating gas.

Embodiment 8 is the method of any of embodiments 1 to 7, wherein the step of separating comprises condensing the regenerating effluent stream to yield the impurity stream and the regenerating recycle stream.

Embodiment 9 is the method of any of embodiments 1 to 8, wherein the recycle stream of the polyolefin production process, the treated recycle stream, the regenerating gas, the regenerating effluent stream, and the regenerating recycle stream each comprise one or more compounds selected from the group consisting of diluent, unreacted monomer, unreacted comonomer, and combinations thereof.

Embodiment 10 is the method of any of embodiments 1 to 9, wherein the regenerating gas and the regenerating effluent stream comprise diluent in a gaseous phase.

Embodiment 11 is the method of any of embodiments 1 to 10, wherein the recycle stream, the treated recycle stream, and the regenerating recycle stream comprise diluent in a liquid phase.

Embodiment 12 is the method of any of embodiments 1 to 11, wherein the diluent is propane, butane, isobutane, pentane, isopentane, hexane, heptane, or combinations thereof.

Embodiment 13 is the method of any of embodiments 1 to 12, wherein the unreacted monomer is ethylene, propylene, octene (e.g., 1-octene), or combinations thereof.

Embodiment 14 is the method of any of embodiments 1 to 13, wherein the unreacted comonomer is hexene, butene, or combinations thereof.

Embodiment 15 is the method of any of embodiments 1 to 14, wherein the desiccant is arranged in one or more desiccant beds in the off-line treater.

Embodiment 16 is the method of embodiment 15, wherein the one or more desiccant beds are selected from molecular sieve, activated alumina, silica gel, montmorillonite clay, calcium oxide, calcium sulfate, calcium chloride, activated carbon, metal salts, phosphorus-containing desiccant compounds, or combinations thereof.

Embodiment 17 is the method of embodiment 16, wherein the one or more desiccant beds comprise a molecular sieve having a pore size of 10 angstroms or more.

Embodiment 18 is the method of any of embodiments 1 to 17, wherein the polyolefin production process comprises from 2 to 40 treaters.

Embodiment 19 is the method of embodiment 18, wherein each treater comprises from 1 to 30 desiccant beds.

Embodiment 20 is the method of any of embodiments 18 to 19, wherein each treater is a feed treater or a recycle treater.

Embodiment 21 is a method of regenerating a desiccant in an off-line treater of a polyolefin production process, the method comprising a heating phase followed by a cooling phase, the cooling phase comprising thermosyphoning a regenerating gas, nitrogen, an olefin-free diluent, or combinations thereof in a closed-convection loop of the off-line treater to cool the off-line treater to a temperature in the range of from 150° F. (66° C.) to 400° F. (204° C.).

Embodiment 22 is the method of embodiment 21, wherein the step of thermosyphoning comprises thermosyphoning the regenerating gas, nitrogen, or both in the closed-convection loop of the off-line treater to cool the off-line treater to a first temperature of about 350° F. (about 177° C.); and thermosyphoning the olefin-free diluent in the closed-convection loop of the off-line treater to cool the off-line treater from the first temperature to a second temperature of about 150° F. (about 66° C.).

Embodiment 23 is the method of any of embodiments 21 to 22, wherein the closed-convection loop comprises a finned air cooler.

Embodiment 24 is the method of any of embodiments 21 to 23, wherein the regenerating gas is obtained by treating a recycle stream of the polyolefin production process in an on-line treater to yield a treated recycle stream; heating at least a portion of the treated recycle stream to yield the regenerating gas; and introducing the regenerating gas to the off-line heater.

Embodiment 25 is the method of any of embodiments 21 to 24, further comprising maintaining a pressure of the off-line treater during the step of thermosyphoning.

Embodiment 26 is the method of any of embodiments 21 to 25, wherein the off-line treater reaches a temperature in the range of 400° F. (204° C.) to 600° F. (316° C.) during the heating phase.

Embodiment 27 is the method of any of embodiments 21 to 26, further comprising a holding phase between the heating phase and the cooling phase, wherein holding phase comprises maintaining the off-line treater at the temperature in the range of 400° F. (204° C.) to 600° F. (316° C.).

Embodiment 28 is the method of any of embodiments 21 to 27, wherein a recycle stream of the polyolefin production process, the treated recycle stream, the regenerating gas, a regenerating effluent stream, and a regenerating recycle stream each comprise one or more compounds selected from the group consisting of diluent, unreacted monomer, unreacted comonomer, and combinations thereof.

Embodiment 29 is the method of embodiment 28, wherein the regenerating gas and the regenerating effluent stream comprise diluent in a gaseous phase.

Embodiment 30 is the method of any of embodiments 28 to 29, wherein the recycle stream, the treated recycle stream, and the regenerating recycle stream comprise diluent in a liquid phase.

Embodiment 31 is the method of any of embodiments 21 to 30, wherein the diluent is propane, butane, isobutane, pentane, isopentane, hexane, heptane, or combinations thereof.

Embodiment 32 is the method of any of embodiments 28 to 31, wherein the unreacted monomer is ethylene, propylene, octene (e.g., 1-octene), or combinations thereof.

Embodiment 33 is the method of any of embodiments 28 to 32, wherein the unreacted comonomer is hexene, butene, or combinations thereof.

Embodiment 34 is the method of any of embodiments 21 to 33, wherein the desiccant is arranged in one or more desiccant beds in the off-line treater.

Embodiment 35 is the method of embodiment 34, wherein the one or more desiccant beds are selected from molecular sieve, activated alumina, silica gel, montmorillonite clay, calcium oxide, calcium sulfate, calcium chloride, activated carbon, metal salts, phosphorus-containing desiccant compounds, or combinations thereof.

Embodiment 36 is the method of embodiment 35, wherein the one or more desiccant beds comprise a molecular sieve having a pore size of 10 angstroms or more.

Embodiment 37 is the method of any of embodiments 21 to 36, wherein the polyolefin production process comprises from 2 to 40 treaters.

Embodiment 38 is the method of embodiment 37, wherein each treater comprises from 1 to 30 desiccant beds.

Embodiment 39 is the method of any of embodiments 37 to 38, wherein each treater is a feed treater or a recycle treater.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of regenerating a desiccant in an off-line treater of a polyolefin production process, the method comprising a heating phase followed by a cooling phase, the heating phase comprising:
   treating a recycle stream of the polyolefin production process in an on-line treater to yield a treated recycle stream;
   heating at least a portion of the treated recycle stream to yield a regenerating gas;
   regenerating at least a portion of the desiccant in the off-line treater using the regenerating gas to yield a regenerating effluent stream;
   separating the regenerating effluent stream into an impurity stream and a regenerating recycle stream; and
   recycling the regenerating recycle stream to the on-line treater.

2. The method of claim 1, the cooling phase comprising:
   thermosyphoning the regenerating gas, nitrogen, or both in a closed-convection loop of the off-line treater to cool the off-line treater to a temperature in the range of 150° F. (66° C.) to 400° F. (204° C.).

3. The method of claim 2, wherein the closed-convection loop comprises a finned air cooler.

4. The method of claim 1, the cooling phase comprising:
   thermosyphoning the regenerating gas, nitrogen, or both in a closed-convection loop of the off-line treater to cool the off-line treater to a first temperature of about 350° F. (about 177° C.); and
   thermosyphoning an olefin-free diluent in the closed-convection loop of the off-line treater to cool the off-line treater from the first temperature to a second temperature of about 150° F. (about 66° C.).

5. The method of claim 1, wherein the off-line treater reaches a temperature in the range of 400° F. (204° C.) to 600° F. (316° C.) during the heating phase.

6. The method of claim 1, wherein the step of regenerating comprises:
   introducing the regenerating gas into the off-line treater; and
   removing an impurity from the desiccant of the off-line treater with the regenerating gas.

7. The method of claim 1, wherein the step of separating comprises:
   condensing the regenerating effluent stream to yield the impurity stream and the regenerating recycle stream.

8. The method of claim 1, wherein the recycle stream of the polyolefin production process, the treated recycle stream, the regenerating gas, the regenerating effluent stream, and the regenerating recycle stream each comprise one or more compounds selected from the group consisting of diluent, unreacted monomer, unreacted comonomer, and combinations thereof.

9. The method of claim 8, wherein the regenerating gas and the regenerating effluent stream comprise diluent in a gaseous phase.

10. The method of claim 8, wherein the recycle stream, the treated recycle stream, and the regenerating recycle stream comprise diluent in a liquid phase.

11. The method of claim 8, wherein the diluent is propane, butane, isobutane, pentane, isopentane, hexane, heptane, or combinations thereof.

12. The method of claim 8, wherein the unreacted monomer is ethylene, propylene, octene, or combinations thereof.

13. The method of claim 8, wherein the unreacted comonomer is hexene, butene, or combinations thereof.

14. A method of regenerating a desiccant in an off-line treater of a polyolefin production process, the method comprising a heating phase followed by a cooling phase, the cooling phase comprising:
    thermosyphoning a regenerating gas, nitrogen, an olefin-free diluent, or combinations thereof in a closed-convection loop of the off-line treater to cool the off-line treater to a temperature in the range of from 150° F. (66° C.) to 400° F. (204° C.).

15. The method of claim 14, wherein the step of thermosyphoning comprises:
    thermosyphoning the regenerating gas, nitrogen, or both in the closed-convection loop of the off-line treater to cool the off-line treater to a first temperature of about 350° F. (about 177° C.); and
    thermosyphoning the olefin-free diluent in the closed-convection loop of the off-line treater to cool the off-line treater from the first temperature to a second temperature of about 150° F. (about 66° C.).

16. The method of claim 14, wherein the closed-convection loop comprises a finned air cooler.

17. The method of claim 14, wherein the regenerating gas is obtained by:
    treating a recycle stream of the polyolefin production process in an on-line treater to yield a treated recycle stream;
    heating at least a portion of the treated recycle stream to yield the regenerating gas; and
    introducing the regenerating gas to the off-line heater.

18. The method of claim 14, further comprising:
    maintaining a pressure of the off-line treater during the step of thermosyphoning.

19. The method of claim 14, wherein the off-line treater reaches a temperature in the range of 400° F. (204° C.) to 600° F. (316° C.) during the heating phase.

20. The method of claim 19, further comprising a holding phase between the heating phase and the cooling phase, wherein holding phase comprises:
    maintaining the off-line treater at the temperature in the range of 400° F. (204° C.) to 600° F. (316° C.).

* * * * *